Jan. 15, 1929.

C. DIERCKS 1,699,055

SELF DRAINING CREAM SEPARATOR BOWL

Filed June 6, 1927

Inventor

Chris Diercks

By Clarence A. O'Brien
Attorney

Patented Jan. 15, 1929.

1,699,055

UNITED STATES PATENT OFFICE.

CHRIS DIERCKS, OF BRYANT, IOWA.

SELF-DRAINING CREAM-SEPARATOR BOWL.

Application filed June 6, 1927. Serial No. 196,835.

My present invention relates to centrifugal cream separator bowls characterized by means for automatically draining the bowls when rotation of the same is stopped.

The object of my invention is the provision of simple and reliable means for the purpose indicated and means susceptible of ready installation and adapted to be quickly and thoroughly cleaned.

To the attainment of the foregoing, the invention consists in the improvement hereinafter described and definitely claimed.

In the accompanying drawings forming part of this specification:—

Similar numerals of reference designate corresponding parts in all the views of the drawings.

Figure 1:
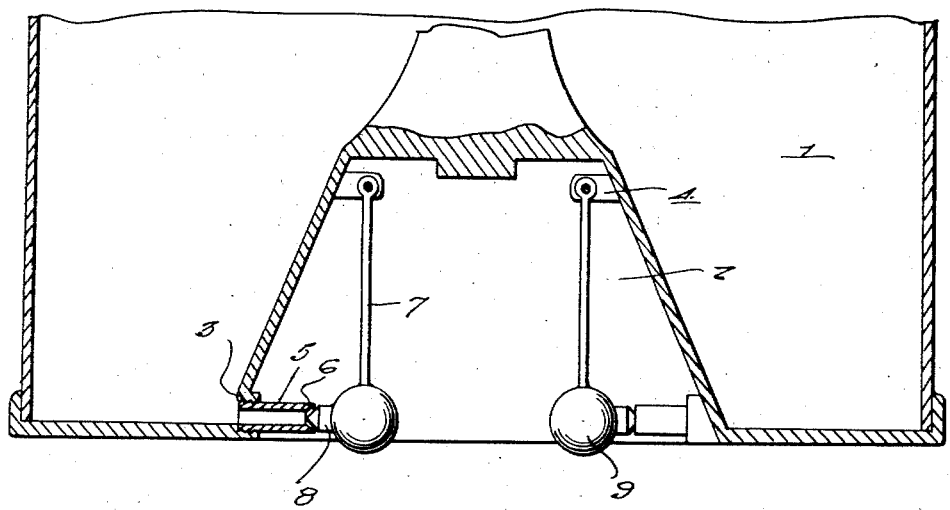
Figure 1 is a fragmentary sectional view, with parts in elevation, illustrating a centrifugal cream separator bowl equipped with my improvement.
Figure 2:
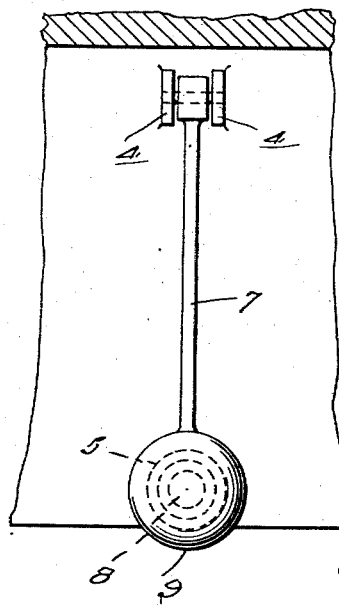
Figure 2 is an enlarged detail section taken in a plane at right angles to Figure 1.

In general the bowl 1 illustrated may be and preferably is of the ordinary well known construction. The said bowl is chambered at 2 and is provided at 3 with drain apertures. In the upper portion of the chamber 2 are brackets 4 and communicating with the apertures 3 are opposite inwardly extending, alined tube sections 5 with taper valve seats 6 at their discharge ends.

Pivotally connected to the brackets 4 and pendent therefrom are radially swingable arms 7 with outwardly extending tapered valves 8, the said valves being opposed to the before mentioned seats 6 and being carried by weights 9 at the lower ends of the arms 7; the said weights 9 being preferably, though not necessarily, globular in form.

It will be readily appreciated from the foregoing that so long as the bowl 1 is rotated at a high rate of speed the centrifugal action on the weights 9 will operate to hold the valves 8 under pressure directly against their seats 6 and in that way prevent leakage from the bowl. When however the bowl 1 comes to a stop, the arms 7 will automatically assume the positions shown in Figure 1, by reason of gravity with the result that the valves 8 will be moved away from the seat 6 and drainage of substance from the bowl will immediately ensue. This prompt draining of the bowl 1 following a skimming operation is materially advantageous inasmuch as it contributes toward maintaining the bowl clean and sweet, especially when the bowl is not cleaned immediately after a skimming operation.

Manifestly my novel means for the purpose indicated is extremely simple and inexpensive in construction and is adapted to be readily installed not only in new bowls but also in bowls at present in use, and the improvement is further advantageous because of the facility and thoroughness with which all the parts embraced in the improvement may be cleaned.

I have specifically described the preferred embodiment of my invention in order to impart a full, clear, and exact understanding of the same. I do not desire, however, to be understood as limiting myself to the precise construction shown, my invention being defined by my appended claim within the scope of which modifications may be made without departure from my invention. For instance, within the purview of my invention only one discharge tube may be employed in conjunction with a pendent arm 7 adapted to hold a valve as 8 against its seat, while the bowl is being rotated at a high rate of speed, and also adapted to move the valve away from its seat immediately following stoppage of the rotation of the bowl.

Having thus described the invention, what I claim as new is:—

In combination, a rotary separator bowl having a discharge disposed at one side of the vertical center of the bowl and also having a valve seat complementary to said discharge and directed toward said center, and a pendent radially swingable arm weighted at its lower end and connected at its upper end to the bowl at a point above the plane of said discharge and having a valve confronting said valve seat and adapted to be held directly against the same by outward movement of the weighted arm under centrifugal action and also adapted to be moved away from the seat when the arm assumes its normal pendent position on cessation of the rotation of the bowl.

In testimony whereof I affix my signature.

CHRIS DIERCKS.